(12) United States Patent
Sato

(10) Patent No.: US 8,168,277 B2
(45) Date of Patent: May 1, 2012

(54) HIGH BARRIER LAMINATED BODY

(75) Inventor: Kazunobu Sato, Kanagawa (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 468 days.

(21) Appl. No.: 12/419,647

(22) Filed: Apr. 7, 2009

(65) Prior Publication Data

US 2009/0269533 A1    Oct. 29, 2009

(30) Foreign Application Priority Data

Apr. 24, 2008 (JP) ................................ 2008-114291

(51) Int. Cl.
*B29D 22/00* (2006.01)
*B32B 27/06* (2006.01)
*B32B 27/08* (2006.01)

(52) U.S. Cl. ................. 428/36.91; 428/35.7; 428/474.9; 428/475.5

(58) Field of Classification Search ............... 428/36.91, 428/35.7, 474.9, 475.5
See application file for complete search history.

(56) References Cited

U.S. PATENT DOCUMENTS 4,987,168 A * 1/1991 Kerschbaumer ............ 524/104

2005/0049363 A1 3/2005 Tebbe et al.

FOREIGN PATENT DOCUMENTS

| EP | 1 886 810 A1 | 2/2008 |
| JP | 2008-133455 A | 6/2008 |

* cited by examiner

*Primary Examiner* — Rena Dye
*Assistant Examiner* — James Yager
(74) *Attorney, Agent, or Firm* — Oblon, Spivak, McClelland, Maier & Neustadt, L.L.P.

(57) ABSTRACT

A laminated body having a thermoplastic resin layer (I) and a polyamide resin layer (II) which is made of nylon 11 and/or nylon 12. The thermoplastic resin layer (I) includes 100 parts by weight of a polyamide resin composition (A) and 0.1 to 10 parts by weight of a carbodiimide compound (B) having two or more carbodiimide groups. The polyamide resin composition (A) contains a polyamide resin (a-1) having diamine units 70 mol % or more of which are derived from m-xylylenediamine and dicarboxylic acid units 70 mol % or more of which are derived from a $C_4$ to $C_{20}$ $\alpha,\omega$-linear aliphatic dicarboxylic acid and a nylon 12 and/or nylon 11 component (a-2) in an amount of 5 to 95% by weight of the component (a-1) and 95 to 5% by weight of the component (a-2) each based on a total weight of the components (a-1) and (a-2). The laminated body is excellent in the barrier property, peeling resistance and mechanical properties such as strength, impact resistance and elongation, particularly in the barrier property to alcohol-containing fuels.

6 Claims, No Drawings

HIGH BARRIER LAMINATED BODY

BACKGROUND OF THE INVENTION

1. Field of the Invention

The present invention relates to laminated bodies excellent in barrier property, peeling resistance and mechanical properties such as strength, impact resistance and elongation, and more particularly, to high barrier laminated bodies particularly suitable as the materials for producing containers, tubes and parts which come into contact with alcohol-containing fuels.

2. Description of the Prior Art

Containers or tubes of a fuel storage system have been produced from various resin materials, because the weight is reduced; a rust proof treatment is not needed; the freedom of shape is high; the number of processing steps is reduced; and the production process is fully automated. In particular, various automobile parts such as tubes, hoses and fuel-related parts are produced from polyamides such as nylon-11 and nylon-12. The polyamides have been widely used because they are light in weight, free from rust and have a good fuel-barrier property to normal gasoline, thus combining excellent properties required in the application to fuel storage.

In recent requirement in reducing the exhaustion of gasoline sources and protecting the environment, the use of a mixed fuel of gasoline added with an alcohol such as ethanol comes to be considered. However, since polyamides have a considerably low barrier to alcohols, the permeation amount of a mixed gasoline through polyamide reaches as high as 50 to 60 times the permeation amount of a normal gasoline. Therefore, polyamide fails to fully meet the regulations which will be made increasingly strict and a material with a higher barrier is keenly required.

It has been known that the heat resistance of a thermoplastic resin is improved by the addition of a polycarbodiimide (JP 2-175757A). It has been also known that the hydrolysis resistance, oil resistance and metal halide resistance of polyamide is improved by the addition of an aliphatic carbodiimide compound (JP 11-343408A). However, these patent documents are completely silent about the improvement in the fuel barrier property, peeling resistance and mechanical properties such as strength, impact resistance and elongation.

SUMMARY OF THE INVENTION

In view of the above problems in the art, an object of the present invention is to provide a laminated body excellent in the barrier property, peeling resistance and mechanical properties such as strength, impact resistance and elongation, particularly, a laminated body having a high barrier property and strength enough to use as a material for producing containers, tubes and parts which come into contact with alcohol-containing fuels.

As a result of extensive studies in view of the above object, the inventor has found that the compatibility of a barrier polyamide having a m-xylylene skeleton with nylon is improved by adding a carbodiimide compound to a specific polyamide resin composition containing the barrier polyamide and nylon, and that the above object is achieve by a laminated body having a layer of the polyamide resin composition and a nylon layer. The present invention has been accomplished on the basis of this finding.

Thus, the present invention relates to a laminated body comprising a thermoplastic resin layer (I) and a polyamide resin layer (II) which comprises nylon 11 and/or nylon 12, the thermoplastic resin layer (I) comprising 100 parts by weight of a polyamide resin composition (A) and 0.1 to 10 parts by weight of a carbodiimide compound (B) having two or more carbodiimide groups, the polyamide resin composition (A) comprising a polyamide resin (a-1) which is constituted by diamine units 70 mol % or more of which are derived from m-xylylenediamine and dicarboxylic acid units 70 mol % or more of which are derived from a $C_4$ to $C_{20}$ $\alpha,\omega$-linear aliphatic dicarboxylic acid and a nylon 12 and/or nylon 11 (a-2) in an amount of 5 to 95% by weight of the component (a-1) and 95 to 5% by weight of the component (a-2) each based on a total weight of the components (a-1) and (a-2). The present invention further relates to a fuel tube produced by using the laminated body.

The thermoplastic resin composition used in the present invention is produced by melt-kneading the barrier polyamide having a m-xylylene skeleton with nylon-11 and/or nylon-12 having a functional group capable of reacting with a carbodiimide group in the presence of the carbodiimide compound. By such a melt kneading, the barrier polyamide and nylon-11 and/or nylon-12 are bonded to each other via the carbodiimide compound, or the barrier polyamide and nylon-11 and/or nylon-12 are respectively reacted with the carbodiimide compound, thereby increasing the compatibility of the barrier polyamide with nylon-11 and/or nylon-12. Therefore, a uniform melt kneading of the barrier polyamide having a m-xylylene skeleton with nylon-11 and/or nylon-12 having excellent flexibility and impact strength, which has been hitherto difficult, can be attained. The thermoplastic resin composition thus obtained is excellent in the barrier property and strength. In addition, the adhesive strength of the thermoplastic resin composition to nylon-11 and/or nylon-12 is high, thereby providing a laminated body also excellent in the peeling strength and impact strength.

Therefore, the laminated body of the present invention is excellent in the barrier property, peeling resistance and mechanical properties such as strength, impact resistance and elongation, particularly in the barrier property to alcohol-containing fuels, and suitably usable in the production of various shaped articles for use in a fuel system such as fuel containers, tubes and parts.

DETAILED DESCRIPTION OF THE INVENTION

A first component of a polyamide resin composition (A) for forming a layer (I) (thermoplastic resin composition layer) is a polyamide resin (a-1). The polyamide resin (a-1) is constituted by diamine constitutional units (constitutional units derived from diamine) and dicarboxylic acid constitutional units (constitutional units derived from dicarboxylic acid), 70 mol % or more, preferably 80 mol % or more (each inclusive of 100%) of the diamine constitutional units being derived from m-xylylenediamine and 70 mol % or more, preferably 80 mol % or more (each inclusive of 100%) of the dicarboxylic acid constitutional units being derived from a $C_4$ to $C_{20}$ $\alpha,\omega$-linear aliphatic dicarboxylic acid.

The polyamide resin (a-1) is produced by the polycondensation of a diamine component 70 mol % or more, preferably 80 mol % or more (each inclusive of 100%) of which is m-xylylenediamine with a dicarboxylic acid component 70 mol % or more, preferably 80 mol % or more (each inclusive of 100%) of which is the $C_4$ to $C_{20}$ $\alpha,\omega$-linear aliphatic dicarboxylic acid.

Examples of the diamine component for the polyamide resin (a-1) include, in addition to m-xylylenediamine, aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin (inclusive of structural isomers) and bis(aminomethyl)tricyclodecane (inclusive of structural isomers); and aromatic ring-containing diamines such as bis(4-aminophenyl)ether, p-phenylenediamine, p-xylylenediamine and bis(aminomethyl)naphthalene (inclusive of structural isomers). The diamines other than m-xylylenediamine may be used alone or in combination of two or more.

Examples of the $C_4$ to $C_{20}$ $\alpha,\omega$-linear aliphatic dicarboxylic acid include aliphatic dicarboxylic acids such as succinic acid, glutaric acid, pimelic acid, suberic acid, azelaic acid, adipic acid, sebacic acid, undecanedioic acid and dodecanedioic acid, with adipic acid being preferred. These dicarboxylic acids may be used alone or in combination of two or more.

The dicarboxylic acid constitutional units may include constitutional units derived from isophthalic acid preferably in an amount of 30 mol % or less (exclusive of zero), more preferably 0 to 25 mol % and still more preferably 5 to 20 mol %. As compared with a polyamide resin in which the dicarboxylic acid constitutional units contain only the units derived from the $C_4$ to $C_{20}$ $\alpha,\omega$-linear aliphatic dicarboxylic acid, a polyamide resin containing the units derived from isophthalic acid has a lower melting point and can be formed at lower temperatures, thereby reducing the energy consumed in the production and shortening the shaping cycle. In addition, since the melt viscosity is high and the drawdown of the resin is avoided, the formability of the resin is improved. However, a thermoplastic resin composition containing such a polyamide resin has a lowered barrier property.

Examples of dicarboxylic acids other than the $C_4$ to $C_{20}$ $\alpha,\omega$-linear aliphatic dicarboxylic acid and isophthalic acid include phthalic acid compounds such as terephthalic acid and orthophthalic acid; naphthalenedicarboxylic acid isomers such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid and 2,7-naphthalenedicarboxylic acid; monocarboxylic acids such as benzoic acid, propionic acid and butyric acid; polycarboxylic acids such as trimellitic acid and pyromellitic acid; and carboxylic acid anhydrides such as trimellitic anhydride and pyromellitic anhydride.

The polyamide resin (a-1) is produced by polycondensing a diamine component containing m-xylylenediamine in an amount of 70 mol % or more with a dicarboxylic acid component containing the $C_4$ to $C_{20}$ $\alpha,\omega$-linear aliphatic dicarboxylic acid in an amount of 70 mol % or more. The method for the production is not particularly limited and a known method such as an atmospheric melt polymerization and a pressure melt polymerization under known conditions may be employed. For example, the polyamide resin (a-1) may be produced by a method in which a m-xylylenediamine—adipic acid nylon salt or a m-xylylenediamine—adipic acid-isophthalic acid nylon salt is heated under pressure in the presence of water, and then, the nylon salt is polycondensed in a molten state while removing the water added and eliminated by the condensation reaction; or a method in which m-xylylenediamine is added directly to a molten adipic acid or a molten mixture of adipic acid and isophthalic acid, thereby allowing the polycondensation to proceed under atmospheric pressure. The latter method is carried out without solidifying the reaction system by continuously adding m-xylylenediamine so as to heat the reaction system, thereby keeping the reaction temperature not lower than the melting point of oligoamide and polyamide being produced.

Into the polycondensation system for producing the polyamide resin (a-1), a lactam such as ε-caprolactam, ω-laurolactam and ω-enantholactam, and an amino acid such as 6-aminocaproic acid, 7-aminoheptanoic acid, 11-aminoundecanoic acid, 12-aminododecanoic acid, 9-aminononanoic acid and p-aminomethylbenzoic acid may be added, unless the properties of the polyamide resin to be produced are adversely affected.

The polyamide resin (a-1) may be heat-treated to increase the melt viscosity. The heat treatment may be conducted, for example, by a method in which the polyamide resin is gently heated for crystallization without causing fusion in the presence of water in an inert gas atmosphere or under reduced pressure using a batch type heater such as a rotary drum and crystallized while avoiding fusion, and then, the crystallized polyamide resin is further heat-treated; a method in which the polyamide resin is heated and crystallized in an inert gas atmosphere in a grooved stirring heater, and then, the crystallized polyamide resin is further heat-treated in an inert gas atmosphere in a hopper heater; or a method in which the polyamide resin is crystallized in a grooved stirring heater, and then, the crystallized polyamide resin is heat-treated in a batch type heater such as a rotary drum, with the method in which the crystallization and the heat treatment are performed in a batch type heater being preferred. The heat treatment is preferably conducted under the following conditions: crystallizing the melt-polymerized polyamide resin by heating from 70° C. to 120° C. over 0.5 to 4 h in the presence of water in an amount of 1 to 30% by weight of the melt-polymerized polyamide resin, and then, heat treating the crystallized polyamide resin at a temperature in the range of Mp−50° C. to Mp−10° C. (Mp=melting point of the polyamide resin (a-1)) for 1 to 12 h in an inert gas atmosphere or under reduced pressure.

The melting point of the polyamide resin (a-1) is preferably from 160 to 240° C., more preferably from 170 to 235° C. and still more preferably from 180 to 230° C.

The glass transition point of the polyamide resin (a-1) is preferably from 80 to 130° C. If being 80° C. or higher, a high barrier property is obtained even at high temperatures.

The polyamide resin (a-1) having an end amino concentration of less than 40 μeq/g, preferably from 10 to 30 μeq/g and an end carboxyl concentration of from 40 to 100 μeq/g is preferably used. If the end amino concentration and end carboxyl concentration are within the above ranges, the yellowing of the barrier layer (layer (I)) to be obtained can be avoided.

The polyamide resin (a-1) may contain a phosphorus compound to enhance the processing stability in a melt forming operation or prevent undesirable discoloration. Preferred is a phosphorus compound containing an alkali metal or an alkaline earth metal. Examples thereof include phosphates, hypophosphites and phosphites of sodium, magnesium, calcium, etc., with hypophosphites of an alkali metal or alkaline earth metal being preferred because of their excellent effect of preventing the discoloration of the polyamide resin. The concentration of the phosphorus compound in the polyamide resin (a-1) is 200 ppm or less, preferably 160 ppm or less and more preferably 100 ppm or less when expressed by the amount of phosphorus atom.

The polyamide resin (a-1) may contain, in addition to the phosphorus compound, various additives such as, but not limited to, lubricant, delustering agent, heat stabilizer, weathering stabilizer, ultraviolet absorber, nucleating agent, plasticizer, flame retardant, antistatic agent, anti-discoloring agent and anti-gelling agent, unless the effects of the present invention are adversely affected.

The polyamide resin composition (A) further contains a nylon-11 and/or nylon-12 component (a-2). Nylon 11 is produced by the polymerization of 11-aminoundecanoic acid or undecanoic lactam. Nylon 12 is produced by the polymerization of 12-aminododecanoic acid or dodecanoic lactam. The nylon-11 and/or nylon-12 component (a-2) may be a copolymer mainly constituted by the monomers mentioned above. The comonomer may be a lactam, an aminocarboxylic acid or a diamine-dicarboxylic acid nylon salt.

Examples of the lactam include ε-caprolactam, enantholactam, undecanoic lactam, dodecanoic lactam, α-pyrrolidone and α-piperidone, examples of the aminocarboxylic acid include 6-aminocaproic acid, 7-aminoheptanoic acid, 9-aminononanoic acid, 11-aminoundecanoic acid and 12-aminododecanoic acid.

The nylon-11 and/or nylon-12 (a-2) may be a homopolymer, a mixture of the homopolymer and the copolymer mentioned above, a mixture of the homopolymer and another type of polyamide resin or thermoplastic resin. The content of nylon-11 and/or nylon-12 in the mixture is preferably 60% by weight or more.

The nylon-11 and/or nylon-12 (a-2) preferably contains a plasticizer such as alkylamides of benzenesulfonic acid, alkylamides of toluenesulfonic acid and alkylesters of hydroxybonzoic acid, or an impact modifier, for example, rubbery polymers such as elastomers.

The nylon-11 and/or nylon-12 (a-2) may contain, if necessary, an additive such as antioxidant, heat stabilizer, ultraviolet absorber, light stabilizer, lubricant, inorganic filler, antistatic agent, flame retardant, and crystallization promoter.

The nylon-11 and/or nylon-12 (a-2) is produced by a known polymerization method such as melt polymerization, solution polymerization and solid-state polymerization.

The relative viscosity of the nylon-11 and/or nylon-12 (a-2) is preferably from 1.5 to 4.5 and more preferably from 1.8 to 4.0. If being less than 1.5, the strength of the resultant layer is insufficient and a problem of uneven thickness is caused in the laminating operation. If exceeding 4.5, the resultant resin composition is difficult to extrude because of a high extrusion pressure and torque and a problem of uneven thickness is caused in the laminating operation.

The polyamide resin composition (A) contains 5 to 95% by weight of the component (a-1) and 95 to 5% by weight of the component (a-2), preferably 10 to 90% by weight of the component (a-1) and 10 to 90% by weight of the component (a-2), more preferably 20 to 80% by weight of the component (a-1) and 20 to 80% by weight of the component (a-2), and particularly preferably 35 to 65% by weight of the component (a-1) and 35 to 65% by weight of the component (a-2), each percentage being based on the total amount of the polyamide resin (a-1) and the nylon-11 and/or nylon-12 (a-2). If the content of the polyamide resin (a-1) is 5% by weight or more, a sufficient barrier property is obtained, and high strength and impact resistance are obtained if the content is 95% by weight or less. Nylon 11 and nylon 12 in the component (a-2) are highly reactive with the carbodiimide compound (B) because of the end carboxyl group and the end amino group.

The content of water in the polyamide resin composition (A) is regulated to, by drying if necessary, preferably 0.3% by weight or less, more preferably 0.1% by weight or less and still more preferably 0.05% by weight or less. If being 0.3% by weight or less, the reaction between the carbodiimide group and water is prevented and the extrusion defect is not caused to obtain a thermoplastic resin composition with excellent properties. If needed, the polyamide resin composition (A) is dried by a known method, for example, by a method in which the polyamide resin composition (A) is heated at a temperature not higher than the melting point of the polyamide resin, preferably at 160° C. or lower under reduced pressure in a heating tumbler equipped with a vacuum pump (rotary vacuum vessel) or a vacuum dryer, although not particularly limited thereto.

Examples of the carbodiimide compound (B) having two or more carbodiimide groups, which is to be contained in the layer (I), include aromatic, aliphatic or alicyclic polycarbodiimide compounds produced by various methods. Preferred is an aliphatic or alicyclic polycarbodiimide compound because of its good melt-kneading property in the extrusion operation, and more preferred is an aliphatic polycarbodiimide compound.

The carbodiimide compound (B) is produced by the decarboxylating condensation of an organic polyisocyanate, for example, a method in which the decarboxylating condensation of an organic polyisocyanate is allowed to proceed at about 70° C. or higher in an inert solvent or without using solvent in the presence of a carbodiimidation catalyst.

Examples of the organic polyisocyanate to be used as a raw material for synthesis of the carbodiimide compound (B) include an aromatic diisocyanate, an aliphatic diisocyanate, an alicyclic diisocyanate, and a mixture thereof. Examples thereof include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane 1,4-diisocyanate, xylylene diisocyanate, isophorone diisocyanate, dicyclohexylmethane 4,4-diisocyanate, methylcyclohexane diisocyanate, tetramethylxylylene diisocyanate, 2,6-diisopropylphenyl isocyanate and 1,3,5-triisopropylbenzene 2,4-diisocyanate.

An end capping agent such as monoisocyanate may be used to control the polymerization degree of the carbodiimide compound (B) by capping its terminal end. Examples of the monoisocyanate include phenyl isocyanate, tolyl isocyanate, dimethylphenyl isocyanate, cyclohexyl isocyanate, butyl isocyanate and naphthyl isocyanate.

The end capping agent is not particularly limited to the above monoisocyanates, and any active hydrogen compounds capable of reacting with isocyanates are usable. Examples of the active hydrogen compounds include aliphatic, aromatic and alicyclic compounds, for example, a compound having —OH group such as methanol, ethanol, phenol, cyclohexanol, N-methyl ethanolamine, polyethylene glycol monomethyl ether and polypropylene glycol monomethyl ether; a secondary amine such as diethylamine and dicyclohexylamine; a primary amine such as butylamine and cyclohexylamine, a carboxylic acid such as succinic acid, benzoic acid and dichlorohexanecarboxylic acid, a thiol such as ethyl mercaptan, allyl mercaptan and thiophenol; and an epoxy group-containing compound.

Examples of the carbodiimidation catalyst include a phospholene oxide such as 1-phenyl-2-phospholene 1-oxide, 3-methyl-1-phenyl-2-phospholene 1-oxide, 1-ethyl-2-phospholene 1-oxide, 3-methyl-2-phospholene 1-oxide and 3-phospholene isomers of these compounds, and a metal catalyst such as tetrabutyl titanate, with 3-methyl-1-phenyl-2-phospholene 1-oxide being preferred because of its high catalytic activity.

In the thermoplastic resin composition for forming the layer (I), the carbodiimide compound (B) may be reacted with the polyamide resin (a-1) or the nylon-11 and/or nylon-12 (a-2).

During the melt kneading of the polyamide resin (a-1), the nylon-11 and/or nylon-12 (a-2) and the carbodiimide compound (B), (i) the polyamide resin (a-1) and the nylon-11 and/or nylon-12 (a-2) are bonded to each other via the carbodiimide compound (B), or (ii) the polyamide resin (a-1) and the nylon-11 and/or nylon-12 (a-2) respectively react with the carbodiimide compound (B).

Therefore, the compatibility between the polyamide resin (a-1) and the nylon-11 and/or nylon-12 (a-2) is enhanced by the action of the carbodiimide compound (B). Such an increased compatibility enables a uniform melt kneading of the barrier polyamide having a m-xylylene skeleton with nylon-11 and/or nylon-12 having an excellent flexibility and a high impact strength, which has been hitherto difficult, thereby providing a thermoplastic resin composition excellent in the barrier property, strength and impact resistance.

The thermoplastic resin composition contains the carbodiimide compound (B) in an amount of from 0.1 to 10 parts by weight, preferably from 0.2 to 8 parts by weight and more preferably from 0.3 to 5 parts by weight per 100 parts by weight of the polyamide resin composition (A).

The relative viscosity of the thermoplastic resin composition is preferably from 1.7 to 4.0 and more preferably from 1.9 to 3.8. The relative viscosity was measured by the method described below.

The thermoplastic resin composition is melt-kneaded and then made into a shaped article by extrusion or injection molding. Since the addition amount of the carbodiimide compound (B) is 0.1 part by weight or more, the thermoplastic resin composition is sufficiently melt-kneaded and causes no drawback such as uneven extrusion. By limiting the addition amount to 10 parts by weight or less, the extrusion difficulties due to an excessive increase in the viscosity can be avoided.

The thermoplastic resin composition may also contain reinforcing fibers such as glass fibers, nucleating agent, lubricant, mold-releasing agent, antioxidant, processing stabilizers, heat stabilizer, ultraviolet absorber, phyllosilicate, inorganic or organic metal salt of Co, Mn, Zn, etc., and complex unless the object of the present invention is adversely affected.

The polyamide resin composition (A) is melt-kneaded with the carbodiimide compound (B) by using any type of extruder generally employed such as a single-screw extruder and a twin-screw extruder, preferably by using a twin-screw extruder in view of the productivity and flexibility.

The melt-kneading temperature is preferably from 200 to 300° C. and the residence time is preferably 10 min or less. The melt-kneading is preferably conducted by using a screw having at least one zone which has a reverse screw element and/or a kneading disk and by holding a part of the material being kneaded at such a zone. If the melt-kneading temperature is within the above range, the extrusion and kneading defects and the decomposition of the material are prevented.

The layer (II) of the laminated body of the invention is a polyamide resin layer made of nylon 11 and/or nylon 12 which is selected from those described above with respect to the polyamide resin compound (A).

The laminated body includes a multi-layer tube, a multi-layer film, a multi-layer sheet and a multi-layer hollow container with a bottle, cup, tray, tube or tank shape, with a tube being preferred. The method of forming the laminated body is not limited. Preferred are an extrusion forming method in which resin materials melt-extruded from two or more extruders are simultaneously laminated inside or outside the die, and a melt forming method such as an injection blow molding, a co-extrusion blow forming and a multi-layer injection molding.

The thickness of the thermoplastic resin composition layer (layer (I)) is preferably from 0.005 to 30 mm and the thickness of the nylon 11 and/or nylon 12 layer (layer (II)) is preferably 0.02 to 40 mm, although not limited thereto.

The laminate tube of the invention has an excellent barrier property to alcohol-containing fuels and suitably applicable to a tube for automobile, etc., for example, a fuel tube such as a feed tube, a return tube, an evaporator tube, a fuel filler tube, an ORVR (on board refueling vapor recovery) tube, a reserve tube, and a bent tube; and a tube for other chemical liquids such as an oil tube, a break tube, a window washer tube, a radiator tube, a cooling water tube, a cooler tube for cooling medium, a cooling medium tube for air conditioner, an under-floor heating tube, a tube for fire-extinguisher or fire-extinguishing equipment, a tube for medical cooling device, and a spreader tube for ink and paint, with the fuel tube being preferred.

The shaped article of the invention is made of the layer (I) and the layer (II) which are preferably firmly bonded to each other by a co-extrusion forming. The layer (II) is preferably the innermost layer which comes into contact with the contents such as fuels. To enhance the strength, the shaped article may be made into a multi-layer shaped article having, in addition to the layers (I) and (II), at least one reinforcing layer which is made of polyolefin, polystyrene, polyester, polycarbonate, polyamide other than those described above, or a fluorine resin.

Examples of the polyolefins for the reinforcing layer include linear low-density polyethylene, low-density polyethylene, medium-density polyethylene, high-density polyethylene and ultrahigh molecular weight high-density polyethylene, polypropylene, copolymer of two or more olefins selected from ethylene, propylene, butene, etc., a mixture thereof, a modified fluorine resin and polyamide other than those for the layers (I) and (II). The polyolefin, polyester, polycarbonate, polyamide and fluorine resin mentioned above may be mixed with each other, mixed with another resin such as elastomer, or mixed with an additive such as carbon black and a flame retardant.

An adhesive resin layer (adhesive layer) may be disposed between the layers of the laminated body, for example, between the thermoplastic resin composition layer and the reinforcing layer. The adhesive resin for the adhesive layer may include a modified polyethylene or polypropylene and a copolymer of olefins such as ethylene, propylene and butene. To bond the thermoplastic resin composition layer and the reinforcing layer made of polyester or polycarbonate, the adhesive resin such as an ethylene-vinyl acetate copolymer, an alkali metal or alkaline earth metal-crosslinked ethylene-acrylic acid copolymer and an ethylene-acrylic acid ester copolymer is usable, although not limited thereto.

EXAMPLES

The present invention will be described in more detail below with reference to the following examples. However, it should be noted that the scope of the invention is not limited thereto. In the following examples and comparative examples, the films were evaluated by the following methods.

(1) Adhesiveness
    Evaluated by peeling off a multi-layer film.
    A: not peeled off
    C: easily peeled off
(2) Total Light Transmittance (%) and Haze Value (%)
    Measured according to ASTM D1003 using a color difference turbidimeter "COH-300A" manufactured by Nippon Denshoku Industries Co., Ltd.
(3) Tensile Properties
    A strip of film having a width of 10 mm and a length of 120 mm was measured for the breaking strength (kgf/mm$^2$), the elongation at break (%) and the elastic modulus (kgf/mm$^2$) according to ASTM-D882 in an atmosphere at 23° C. and 50% RH at a chuck interval of 50 mm and a pulling speed of 50 mm/min using StrographV1-C manufactured by Toyo Seiki Seisaku-Sho, Ltd.
(4) Impact Puncture Strength (kgf·cm)
    Measured at 23° C. and 50% RH using a film impact tester "ITF-60" manufactured by Tosoku Seimitsu Kogyo, Co., Ltd. (falling dart: spherical tip end of ½ inch (1.25 mm) diameter).
(5) Oxygen Barrier Property (Oxygen Permeability) (cc/(m$^2$·day·atm))
    Measured according to ASTM D3985 at 23° C., a relative humidity of 60% (film inside) and an ambient relative humidity of 50% using an oxygen permeability tester "OX-TRAN 10/50A" manufactured by Modern Controls, Inc.
(6) Fuel Barrier Property (Fuel Permeation Amount)
    Two pieces of 12 cm×15 cm films were superimposed with one on the other and then heat-sealed at three sides with a sealing width of 10 mm to form a bag. After filling 60 g of fuel (isooctane/toluene/ethanol=45/45/10 by volume), the open side of the bag was heat-sealed with a sealing width of 10 mm. The fuel-filled bag was allowed to stand in an explosion-proof type thermo-hygrostatic chamber under conditions of 28° C./65% RH for 10 days. The weight of the fuel-filled bag was measured before and after the 10-day standing. The fuel permeation amount (g/day) was determined from the loss of weight.
(7) Relative Viscosity
    Accurately weighed one gram of a sample was dissolved in 100 cc of 96% sulfuric acid at 20 to 30° C. under stirring. Immediately after complete dissolution, 5 cc of the solution was placed in a Canon Fenske viscometer, and the viscometer was allowed to stand in a thermostatic chamber maintained at 25±0.03° C. for 10 min. Then, a dropping time (t) of the solution was measured. Also, a dropping time ($t_0$) of the 96% sulfuric acid was measured. The relative viscosity was calculated from the measured t and $t_0$ according to the following formula:

Relative Viscosity=$t/t_0$.

Example 1

A mixed composition containing 45% by weight of poly-m-xylylene adipamide (polyamide resin I) and 55% by weight of nylon 12 was prepared.
Poly-m-xylylene Adipamide
    "MX Nylon S6001" manufactured by Mitsubishi Gas Chemical Company, Inc., a polyamide resin produced from m-xylylenediamine and adipic acid.
    Relative viscosity: 2.1
    Water content: 0.03% by weight
    End amino concentration: 30 μeq/g
    End carboxyl concentration: 75 μeq/g Nylon 12
    "UBE 3030XA" manufactured by UBE Industries, Ltd.
    End amino concentration: 22 μeq/g
    End carboxyl concentration: 51 μeq/g
    Relative viscosity: 2.2

The mixed composition (100 parts by weight) and 0.7 part by weight of an aliphatic polycarbodiimide compound (polycarbodiimide compound I, "Carbodilite LA-1" manufactured by Nisshinbo Industries, Inc.) were dry-blended to prepare a thermoplastic resin composition. Then, the thermoplastic resin composition was fed into a twin-screw extruder through a metering feeder at a feed rate of 6 kg/h. The twin-screw extruder was mounted with strong kneading type screws having a cylinder diameter of 37 mm and a retention zone composed of reverse screw elements. The thermoplastic resin composition was melt-kneaded at a cylinder temperature of 270° C. and a screw rotating speed of 100 rpm, and extruded into molten strands, which were then cooled with a cooling air, solidified and pelletized to produce pellets of the thermoplastic resin composition I.

Using a production apparatus for multi-layer film composed of two extruders, feed blocks, T-dies, cooling role, take-up winder, etc., the thermoplastic resin composition I was extruded from a first extruder while co-extruding nylon 12 mentioned above from a second extruder, to produce a 2-kind, 2-layer multi-layer film having a layered structure of thermoplastic resin composition layer (100 μm)/nylon 12 layer (100 μm). The evaluation results of the obtained multi-layer film are shown in Table 1.

Example 2

A multi-layer film was produced in the same manner as in Example 1 except for using a polyamide resin composition containing 60% by weight of the polyamide resin I, 40% by weight of nylon 12 and 1 part by weight of the polycarbodiimide compound I per 100 parts by weight of the mixed composition of the polyamide resin I and nylon 12. The evaluation results of the obtained multi-layer film are shown in Table 1.

Example 3

A multi-layer film was produced in the same manner as in Example 1 except for using nylon 11 ("Rilsan BESVOA FDA" manufactured by Atofina, end amino concentration: 10 μeq/g, end carboxyl concentration: 143 μeq/g, relative viscosity: 2.3) in place of nylon 12. The evaluation results of the obtained multi-layer film are shown in Table 1.

Comparative Example 1

The polyamide resin I was fed into a T-die twin-screw extruder (cylinder diameter: 20 mm) through a metering feeder at a feed rate of 1.2 kg/h. After melt-kneading at a cylinder temperature of 260° C. and a screw rotating speed of 80 rpm, the polyamide resin I was extruded into a form of film through the T-die. The extruded film was solidified by a cooling role at 70° C. while taking up at a speed of 2.7 m/min, to produce a single-layer film with a thickness of 100 μm. The evaluation results are shown in Table 1.

Comparative Example 2

A single-layer film was produced in the same manner as in Comparative Example 1 except for using only nylon 12 in place of the polyamide resin I. The evaluation results are shown in Table 1.

Comparative Example 3

A 2-kind, 2-layer multi-layer film having a layered structure of polyamide resin I layer (100 μm)/nylon 12 layer (100 μm) in the same manner as in Example 1 except for co-extruding the polyamide resin I from the first extruder and nylon 12 from the second extruder. The evaluation results of the obtained multi-layer film are shown in Table 1.

TABLE 1

|  | Examples | | | Comparative Examples | | |
|---|---|---|---|---|---|---|
|  | 1 | 2 | 3 | 1 | 2 | 3 |
| Adhesiveness | A | A | A | — | — | C |
| Total light transmittance (%) | 80 | 80 | 80 | 90 | 90 | — |
| Haze value (%) | 37 | 35 | 33 | 1 | 2 | — |
| Breaking strength (kgf/mm$^2$) | 6 | 5 | 5 | 8 | 9 | — |
| Elongation at break (%) | 400 | 250 | 200 | 3 | 570 | — |
| Elastic modulus (kgf/mm$^2$) | 110 | 140 | 120 | 320 | 80 | — |
| Impact puncture strength (kgf · cm) | 36 | 25 | 31 | 1 | >60 | — |
| Oxygen permeability (cc/(m$^2$ · day · atm)) | 7 | 4 | 8 | 0.9 | 240 | — |
| Fuel permeation amount (g/day) | 0.7 | 0.4 | 0.8 | 0.05 | 1.4 | — |

The laminated body of the present invention is excellent in the barrier property, peeling resistance and mechanical properties such as strength, impact resistance and elongation, particularly in the barrier property to alcohol-containing fuels, and suitably used in the production of various shaped articles for use in a fuel system such as fuel containers, tubes and parts.

What is claimed is:

1. A laminated body comprising a thermoplastic resin layer (I) and a polyamide resin layer (II) which comprises nylon 11 and/or nylon 12, the thermoplastic resin layer (I) comprising 100 parts by weight of a polyamide resin composition (A) and 0.1 to 10 parts by weight of a carbodiimide compound (B) having two or more carbodiimide groups, the polyamide resin composition (A) comprising a polyamide resin (a-1) which is constituted by diamine units 70 mol % or more of which are derived from m-xylylenediamine and dicarboxylic acid units 70 mol % or more of which are derived from a C4 to C20 α,ω-linear aliphatic dicarboxylic acid and a nylon 12 and/or nylon 11 (a-2) in an amount of 35 to 65% by weight of the component (a-1) and 65 to 35% by weight of the component (a-2) each based on a total weight of the components (a-1) and (a-2).

2. The laminated body according to claim 1, wherein 30 mol % or less of the dicarboxylic acid units are derived from isophthalic acid.

3. The laminated body according to claim 1, wherein the carbodiimide compound (B) is an aliphatic or alicyclic carbodiimide compound.

4. The laminated body according to claim 1, wherein the thermoplastic resin layer (I) and the polyamide resin layer (II) are laminated by a co-extrusion method.

5. The laminated body according to claim 1, which is made into a fuel tube.

6. The laminated body according to claim 5, wherein the polyamide resin layer (II) forms an innermost layer of the fuel tube.

* * * * *